United States Patent
Deng et al.

(10) Patent No.: US 11,796,844 B2
(45) Date of Patent: Oct. 24, 2023

(54) DISPLAY DEVICE AND MANUFACTURING METHOD THEREOF

(71) Applicants: Chongqing BOE Optoelectronics Technology Co., Ltd., Chongqing (CN); BOE Technology Group Co., Ltd., Beijing (CN)

(72) Inventors: Yong Deng, Beijing (CN); Sijun Lei, Beijing (CN); Yansheng Sun, Beijing (CN); Yuxu Geng, Beijing (CN); Hebing Ma, Beijing (CN); Chaojie Zhang, Beijing (CN); Wencheng Luo, Beijing (CN); Pingjia Yu, Beijing (CN); Jingru Hu, Beijing (CN); Jian Chen, Beijing (CN); Rong Huang, Beijing (CN); Haixu Zou, Beijing (CN); Xinzhi Shao, Beijing (CN); Song Liu, Beijing (CN); Lv Lv, Beijing (CN)

(73) Assignees: Chongqing BOE Optoelectronics Technology Co., Ltd., Chongqing (CN); BOE Technology Group Co., Ltd., Beijing (CN)

(*) Notice: Subject to any disclaimer, the term of this patent is extended or adjusted under 35 U.S.C. 154(b) by 45 days.

(21) Appl. No.: 17/504,535

(22) Filed: Oct. 19, 2021

(65) Prior Publication Data
US 2022/0269116 A1    Aug. 25, 2022

(30) Foreign Application Priority Data
Feb. 20, 2021  (CN) .......................... 202110193905.5

(51) Int. Cl.
*G02F 1/13* (2006.01)
*G02F 1/1339* (2006.01)
(Continued)

(52) U.S. Cl.
CPC .......... *G02F 1/1323* (2013.01); *G02F 1/1339* (2013.01); *G02F 1/1347* (2013.01); *G02F 1/133531* (2021.01); *G02F 2202/28* (2013.01)

(58) Field of Classification Search
CPC ................................................... G02F 1/1323
See application file for complete search history.

(56) References Cited

U.S. PATENT DOCUMENTS

2012/0169633 A1   7/2012  Huang
2018/0031897 A1*  2/2018  Kikuchi ............ G02F 1/133512
(Continued)

FOREIGN PATENT DOCUMENTS

CN   102566808 A   7/2012
CN   202713409 U   1/2013
(Continued)

*Primary Examiner* — Edmond C Lau
(74) *Attorney, Agent, or Firm* — Ling Wu; Stephen Yang; Ling and Yang Intellectual Property (57) ABSTRACT

A display device and a manufacturing method thereof are provided. The display device includes a first liquid crystal panel for displaying a picture, a second liquid crystal panel for switching between a privacy mode and a sharing mode, and a back light assembly for emitting light; the second liquid crystal panel is disposed on a light-emitting side of the back light assembly; the first liquid crystal panel is disposed on a side of the second liquid crystal panel away from the back light assembly, and a spacer film is disposed between the first liquid crystal panel and the second liquid crystal panel, and is attached to the second liquid crystal panel.

15 Claims, 2 Drawing Sheets

(51) Int. Cl.
  *G02F 1/1347* (2006.01)
  *G02F 1/1335* (2006.01)

(56) References Cited

U.S. PATENT DOCUMENTS

| | | | |
|---|---|---|---|
| 2019/0011774 A1* | 1/2019 | Hirayama | G02F 1/133553 |
| 2019/0033632 A1* | 1/2019 | Lee | G09G 3/36 |
| 2020/0209925 A1* | 7/2020 | Paek | G06F 1/1637 |
| 2021/0294133 A1 | 9/2021 | Yuan et al. | |

FOREIGN PATENT DOCUMENTS

| | | |
|---|---|---|
| CN | 110068946 A | 7/2019 |
| CN | 111208666 A | 5/2020 |

\* cited by examiner

DISPLAY DEVICE AND MANUFACTURING METHOD THEREOF

CROSS-REFERENCE TO RELATED APPLICATION

The present application claims priority of Chinese Patent Application No. 202110193905.5 filed to the CNIPA on Feb. 20, 2021, the content of which is hereby incorporated by reference.

TECHNICAL FIELD

Embodiments of the present disclosure relate to, but are not limited to, the technical field of display, in particular to a display device and a method for manufacturing the display device.

BACKGROUND

With continuous developments of display technology, people's demands for display modes are becoming more and more diversified, and users have increasingly strong awareness of personal privacy protection. More and more scenes require a display device to have a privacy function. For example, in a field of business display, display requirements such as portability, privacy and high color gamut and high contrast are put forward, therefore privacy display technology has become an important content of high-end business laptops as a privacy protection method.

At present, in order to meet the privacy function, many solutions have been proposed. For example, one solution is to place a privacy film in back light, and use louver characteristics of the privacy film to forcibly collimate light passing through the privacy film. However, because the privacy film will reduce back light brightness by 40%, this solution has a problem of high power consumption. For another example, another solution is to use double-layer panel and use switch panel to realize privacy switch. Although this solution can meet requirements of privacy viewing angle and brightness, there are some problems such as a large overall thickness and a water stain defect due to the use of the double-layer panel in this solution.

SUMMARY

The following is a summary of subject matters described in detail herein. The summary is not intended to limit the scope of protection of the claims.

An embodiment of the disclosure provides a display device, which includes a first liquid crystal panel for displaying a picture, a second liquid crystal panel for switching between a privacy mode and a sharing mode, and a back light assembly for emitting light; the second liquid crystal panel is disposed on a light-emitting side of the back light assembly; the first liquid crystal panel is disposed on a side of the second liquid crystal panel away from the back light assembly, and a spacer film is disposed between the first liquid crystal panel and the second liquid crystal panel, and the spacer film is attached to the second liquid crystal panel.

In an exemplary embodiment, a material of the spacer film includes polymethylmethacrylate or polycarbonate.

In an exemplary embodiment, a thickness of the spacer film is 30 μm to 90 μm.

In an exemplary embodiment, a side surface of the spacer film is provided with an adhesive layer, and the spacer film is attached to the second liquid crystal panel through the adhesive layer.

In an exemplary embodiment, a thickness of the adhesive layer is less than 10 μm.

In an exemplary embodiment, the adhesive layer is formed by performing surface treatment on the spacer film.

In an exemplary embodiment, the first liquid crystal panel includes a first array substrate, a first counter substrate and a first liquid crystal layer disposed between the first array substrate and the first counter substrate; the second liquid crystal panel includes a second array substrate, a second counter substrate and a second liquid crystal layer disposed between the second array substrate and the second counter substrate.

In an exemplary embodiment, a ratio of a refractive index of the spacer film to a refractive index of the second liquid crystal layer in the second liquid crystal panel is 0.9 to 1.1.

In an exemplary embodiment, a refractive index of the spacer film is equal to the refractive index of the second liquid crystal layer.

In an exemplary embodiment, the display device further includes: a first polarizer, a second polarizer, a third polarizer and a seal frame, wherein the first polarizer is disposed on a surface of the first liquid crystal panel away from the back light assembly; the second polarizer and the seal frame are disposed on a surface of the second liquid crystal panel away from the back light assembly; the third polarizer is disposed on a side of the second liquid crystal panel close to the back light assembly; the spacer film is disposed on a surface of the second polarizer away from the back light assembly.

In an exemplary embodiment, a transmission axis of the first polarizer is perpendicular to a transmission axis of the second polarizer, and the transmission axis of the second polarizer is perpendicular to a transmission axis of the third polarizer.

In an exemplary embodiment, the seal frame includes a first seal frame and a second seal frame which are stacked, wherein the first seal frame is disposed on a side close to the first liquid crystal panel and the second seal frame is disposed on a side close to the second liquid crystal panel; an inner edge of the annular first seal frame forms a first opening for accommodating the spacer film, and an inner edge of the annular second seal frame forms a second opening for accommodating the second polarizer.

In an exemplary embodiment, an orthographic projection of the first opening on the second liquid crystal panel includes an orthographic projection of the spacer film on the second liquid crystal panel; and an orthographic projection of the second opening on the second liquid crystal panel includes an orthographic projection of the second polarizer on the second liquid crystal panel.

In an exemplary embodiment, a thickness of the first seal frame is 40 μm to 100 μm, and a thickness of the second seal frame is 100 μm to 150 μm.

In an exemplary embodiment, a surface of the first seal frame close to the first liquid crystal panel is flush with a surface of the spacer film close to the first liquid crystal panel.

In an exemplary embodiment, a surface of the second polarizer close to the first seal frame is in contact with a surface of the first seal frame close to the second polarizer.

In order to solve the above technical problems, an embodiment of the present disclosure provides a method for manufacturing a display device.

preparing a first liquid crystal panel for displaying a picture, a second liquid crystal panel for switching between a privacy mode and a sharing mode, a back light assembly for emitting light and a spacer film;

attaching the spacer film on the second liquid crystal panel; and disposing a second liquid crystal panel on a light-emitting side of the back light assembly, disposing the first liquid crystal panel on a side of the second liquid crystal panel away from the back light assembly; and disposing the spacer film between the first liquid crystal panel and the second liquid crystal panel.

In an exemplary embodiment, the method further includes:

preparing a seal frame, wherein the seal frame include a first seal frame and a second seal frame which are stacked; an inner edge of the annular first seal frame is formed with a first opening, and an inner edge of the annular second seal frame is formed with a second opening;

disposing the first liquid crystal panel on a side of the second liquid crystal panel away from the back light assembly includes:

the seal frame is disposed on a side of the second liquid crystal panel away from the back light assembly; the second seal frame is disposed on a side near the second liquid crystal panel; the first seal frame is disposed on a side away from the second liquid crystal panel; the spacer film is disposed in the first opening; and the second polarizer is disposed in the second opening;

the first liquid crystal panel is disposed on a side of the seal frame away from the second liquid crystal panel.

Other aspects may be comprehended upon reading and understanding of the drawings and the detailed descriptions.

BRIEF DESCRIPTION OF DRAWINGS

The drawings are used to provide an understanding of technical solutions of the present disclosure, form a part of the specification, and are used to explain, together with the embodiments of the present disclosure, the technical solutions of the present disclosure and are not intended to form limitations on the technical solutions of the present disclosure.

DETAILED DESCRIPTION

Hereinafter, the embodiments of the present disclosure will be described in detail in combination with the accompanying drawings. It should be noted that the embodiments may be implemented in many different forms. Those of ordinary skills in the art may readily understand the fact that implementations and contents may be transformed into a variety of forms without departing from the spirit and scope of the present disclosure. Therefore, the present disclosure should not be construed as being limited only to what is described in the following embodiments. The embodiments and features in the embodiments in the present disclosure may be combined randomly if there is no conflict.

In the drawings, the size of each constituent element, or the thickness or area of a layer, is sometimes exaggerated for clarity. Therefore, an implementation of the present disclosure is not necessarily limited to the size shown, and a shape and size of each component in the drawings do not reflect true scales. In addition, the drawings schematically show ideal examples, and an implementation of the present disclosure is not limited to the shapes or values shown in the drawings.

The ordinal numbers "first", "second", "third" and the like in this specification are used to avoid confusion between constituent elements, but not to constitute limitations on quantities.

In this specification, for sake of convenience, wordings, such as "central", "upper", "lower", "front", "rear", "vertical", "horizontal", "top", "bottom", "inner", "outer" and the like which are used to indicate orientation or positional relations, to describe the positional relations between constituent elements with reference to the drawings, are only for a purpose of facilitating description of this specification and simplifying the description, rather than indicating or implying that the device or element referred to must have a specific orientation, or must be constructed and operated in a particular orientation, and therefore may not be construed as limitations on the present disclosure. The positional relations between the constituent elements may be appropriately changed according to the direction in which each constituent element is described. Therefore, the wordings are not limited in the specification, and may be replaced appropriately according to situations.

In this specification, terms "install", "connect" and "couple" shall be understood in a broad sense unless otherwise explicitly specified and defined. For example, a connection may be a fixed connection, or a detachable connection, or an integrated connection; it may be a mechanical connection, or an electrical connection; it may be a direct connection, or an indirect connection through middleware, or an internal connection between two elements. Those of ordinary skills in the art may understand the meanings of the terms in the present disclosure according to specific situations.

In this specification, a transistor refers to an element including at least three terminals, namely a gate electrode, a drain electrode and a source electrode. The transistor has a channel region between the drain electrode (a drain electrode terminal, a drain region or a drain electrode) and the source electrode (a source electrode terminal, a source region or a source electrode), and current may flow through the drain electrode, the channel region and the source electrode. It should be noted that in this specification, the channel region refers to a region through which current mainly flows.

In this specification, the first electrode may be a drain electrode and the second electrode may be a source electrode, or the first electrode may be a source electrode and the second electrode may be a drain electrode. Functions of the "source electrode" and the "drain electrode" are sometimes interchangeable in a case where transistors with opposite polarities are used or in a case where the current direction changes during circuit operation. Therefore, in this specification, "source electrode" and "drain electrode" are interchangeable.

In this specification, an "electrical connection" includes a case where constituent elements are connected together through an element having a certain electrical action. The "element having a certain electrical action" is not particularly limited as long as it may transmit and receive electrical signals between connected constituent elements. Examples of the "element having a certain electrical action" include not only electrodes and wirings, but also switching elements such as transistors, resistors, inductors, capacitors, and other elements having various functions.

In this specification, "parallel" refers to a state where an angle formed by two straight lines is above −10 degrees and below 10 degrees, and thus may include a state where the angle is above −5 degrees and below 5 degrees. In addition, "perpendicular" refers to a state that an angle formed by two straight lines is larger than 80 degrees and smaller than 100 degrees, and thus may include a state that the angle is larger than 85 degrees and smaller than 95 degrees.

In this specification, "film" and "layer" may be interchangeable. For example, sometimes "conductive layer" may be replaced by "conductive film". Similarly, "insulating film" may sometimes be replaced by "insulating layer".

"About" in the present disclosure means that limits of a value are not limited strictly, and the value is within a range of process and measurement errors.

At present, a solution for full lamination of an optically clear adhesive (OCA) has been proposed, in which the OCA is disposed between two layers of panels and attached to a lower surface of an upper panel. At present, a minimum thickness of OCA is 150 nm, and the full lamination solution requires a larger frame of the panel (which is required by a full lamination process), so this solution not only increases an overall thickness of the display device, which is not conducive to the thinness of modules, but also may not be applied to modules with ultra-narrow frames. In addition, the full lamination of the OCA requires special attachment equipment, resulting in difficulties in processes and high production costs. In order to avoid an increase in the overall thickness of the display device caused by attaching of the OCA, a solution of eliminating water stain defects by using a second polarizer is proposed. The water stain defects may be eliminated to some extent by haze treatment of the second polarizer. Since the OCA attachment adhesive is not provided in this solution, the overall thickness of the display device will not be increased, but this solution will lead to an increase in viewing angle of the module and degrades the privacy function. Therefore, how to effectively solve problems such as water stain defects without increasing the overall thickness while ensuring the privacy function is a problem that needs to be solved urgently with the double-layer panel structure.

Figure 1:
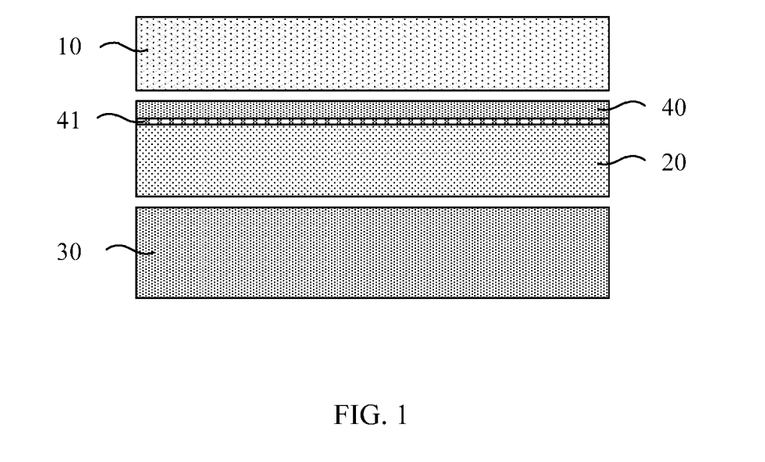
FIG. 1 is a schematic diagram of a structure of a display device according to an exemplary embodiment of the present disclosure.

FIG. 1 is a schematic diagram of a structure of a display device according to an exemplary embodiment of the present disclosure. As shown in FIG. 1, in an exemplary embodiment, the display device may include a first liquid crystal panel 10, a spacer film 40, a second liquid crystal panel 20, and a back light assembly 30, which are sequentially disposed. In an exemplary embodiment, the first liquid crystal panel 10 is used for displaying pictures, the second liquid crystal panel 20 is used for switching between a privacy mode and a sharing mode, the back light assembly 30 is used for emitting light, the second liquid crystal panel 20 is disposed on a light-emitting side of the back light assembly 30, the first liquid crystal panel 10 is disposed on a side of the second liquid crystal panel 20 away from the back light assembly 30, and the spacer film 40 is disposed between the first liquid crystal panel 10 and the second liquid crystal panel 20. The spacer film 40 is used for eliminating water stain defects and rainbow pattern defects caused by adsorption. In an exemplary embodiment, a surface of the spacer film 40 close to the second liquid crystal panel 20 is provided with an adhesive layer 41, and the spacer film 40 is attached to a surface of the second liquid crystal panel 20 close to the first liquid crystal panel 10 through the adhesive layer 41.

In an exemplary embodiment, a thickness of the spacer film 40 may be about 30 μm to 90 μm, and a thickness of the adhesive layer 41 may be less than 10 μm. For example, the thickness of the spacer film 40 may be about 50 μm so that a sum of the thicknesses of the spacer film 40 and the adhesive layer 41 is less than 60 μm.

In an exemplary embodiment, the spacer film 50 may be made of a transparent material, such as polymethylmethacrylate (PMMA) or polycarbonate (PC).

In an exemplary embodiment, the adhesive layer 41 may be formed by performing surface treatment on the spacer film 40.

In an exemplary embodiment, the first liquid crystal panel 10 for displaying a picture includes a first array substrate, a first counter substrate, and a first liquid crystal layer disposed between the first array substrate and the first counter substrate. The second liquid crystal panel for switching between the privacy mode and the sharing mode includes a second array substrate, a second counter substrate and a second liquid crystal layer disposed between the second array substrate and the second counter substrate. A ratio of a refractive index of the spacer film 40 to a refractive index of the second liquid crystal layer in the second liquid crystal panel 20 is 0.9 to 1.1. For example, the refractive index of the spacer film may be equal to the refractive index of the second liquid crystal layer, and the refractive index of the second liquid crystal layer may be about 1.5. By setting the refractive index of the spacer film approximately equal to the refractive index of the second liquid crystal layer, the rainbow pattern defect caused by the change of optical path may be eliminated. When there is a large difference between the refractive index of the spacer film and the refractive index of the second liquid crystal layer, there will be a mismatch of refractive indexes between the spacer film and the second liquid crystal layer, which will lead to light path refraction and reflection at interfaces of different refractive layers, and thus leading to a rainbow pattern defect.

In an exemplary embodiment, the display device may further include a first polarizer, a second polarizer and a third polarizer. The first polarizer may be disposed on a surface of the first liquid crystal panel 10 away from the second liquid crystal panel 20. The second polarizer may be disposed on a surface of the second liquid crystal panel 20 close to the first liquid crystal panel 10. The third polarizer may be disposed on a surface of the second liquid crystal panel 20 away from the first liquid crystal panel 10, and the spacer film 40 is attached to a surface of the second polarizer close to the first liquid crystal panel 10 through the adhesive layer 41.

In an exemplary embodiment, a transmission axis of the first polarizer is perpendicular to a transmission axis of the second polarizer, and the transmission axis of the second polarizer is perpendicular to a transmission axis of the third polarizer. For example, the transmission axis of the first polarizer may be 90 degrees, the transmission axis of the second polarizer may be 0 degree, and the transmission axis of the third polarizer may be 90 degrees.

Figure 2:
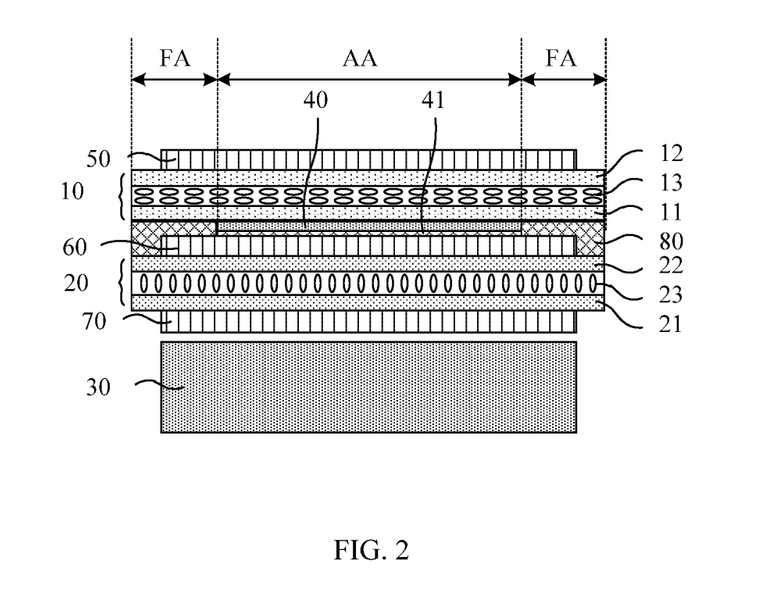
FIG. 2 is a schematic diagram of a structure of another display device according to an exemplary embodiment of the present disclosure.

FIG. 2 is a schematic diagram of a structure of another display device according to an exemplary embodiment of the present disclosure. As shown in FIG. 2, the display device may include a first liquid crystal panel 10, a second liquid crystal panel 20, a back light assembly 30, a spacer film 40, a first polarizer 50, a second polarizer 60, a third polarizer 70 and a seal frame 80. The second liquid crystal panel 20 is disposed on a light-emitting side of the back light assembly 30. The third polarizer 70 is disposed on a surface of the second liquid crystal panel 20 close to the back light assembly 30. The second polarizer 60 and the seal frame 80 are disposed on a surface of the second liquid crystal panel 20 away from the back light assembly 30. The spacer film 40 is disposed on a surface of the second polarizer 60 away from the back light assembly 30. The spacer film 40 is attached to a surface of the second polarizer 60 through the adhesive layer 41. The first liquid crystal panel 10 is disposed on a surface of the seal frame 80 away from the back light assembly 30. The first polarizer 50 is disposed on a surface of the first liquid crystal panel 10 away from the backlight assembly 30. The second polarizer 60 is located between the first liquid crystal panel 10 and the second liquid crystal panel 20, so the second polarizer 60 may be used as a polarizer for both the first liquid crystal panel 10 and the second liquid crystal panel 20. The first liquid crystal panel 10 and the second liquid crystal panel 20 share the second polarizer 60, which can effectively reduce an overall thickness of the display device and save material costs.

In an exemplary embodiment, the first liquid crystal panel 10 may adopt an advanced super dimension switch (ADS) display mode, an in plane switching (IPS) display mode or a fringe field switching (FFS) display mode. In an exemplary embodiment, taking the first liquid crystal panel 10 using the ADS display mode as an example, the first liquid crystal panel 10 may include a first array substrate 11 and a first counter substrate 12 which are oppositely disposed, and the first liquid crystal layer 13 is disposed between the first array substrate 11 and the first counter substrate 12. The first array substrate 11 may include a first array base substrate and a first array structure layer disposed on the first array substrate. The first array structure layer may include a first thin film transistor, a first pixel electrode and a first common electrode, and one of the first common electrode and the first pixel electrode is a plate electrode and the other is a slot electrode. The first counter substrate 12 may include a first counter base substrate and a color filter structure layer disposed on the first counter base substrate, wherein the color filter structure layer may include a black matrix and color photoresists. In the first liquid crystal panel, the first pixel electrode and the first common electrode are located on a same side of the first liquid crystal layer, and the first pixel electrode and the first common electrode are used for driving the liquid crystal to deflect, so that light rays pass through the color photoresists to form light with different gray tones and colors.

In an exemplary embodiment, the second liquid crystal panel 20 may adopt a twisted nematic (TN) display mode. In an exemplary embodiment, the second liquid crystal panel 20 may include a second array substrate 21 and a second counter substrate 22 which are oppositely disposed, wherein the second liquid crystal layer 23 is disposed between the second array substrate 21 and the second counter substrate 22. The second array substrate 21 may include a second array base substrate and a second array structure layer disposed on the second array base substrate, wherein the second array structure layer may include a second thin film transistor and a second pixel electrode. The second counter substrate 22 may include a second counter base substrate and a counter structure layer disposed on the second counter base substrate, wherein the counter structure layer may include a black matrix and a second common electrode. In the second liquid crystal panel, the second pixel electrode and the second common electrode are located at opposite sides of the second liquid crystal layer, and the second pixel electrode and the second common electrode are used for inputting corresponding voltages to make the second liquid crystal panel switch between a privacy mode and a sharing mode.

In an exemplary embodiment, the first liquid crystal panel 10 adopts liquid crystal display (LCD), which may include multiple parallel gate lines and counter parallel data lines, wherein the multiple gate lines and the multiple data lines vertically intersect to define multiple sub-pixels. The multiple sub-pixels are regularly arranged in a matrix, and a thin film transistor (TFT) in each sub-pixel is connected to a gate line and a data line.

In an exemplary embodiment, the first liquid crystal panel 10 and the second liquid crystal panel 20 may further include film layers of other structures, such as alignment films, which are not limited hereto in the present disclosure.

In an exemplary embodiment, a display process of the display device may include: when the second liquid crystal panel 20 is not powered on, a polarization state of light with a small viewing angle and light with a large viewing angle from the back light assembly 30 does not change when passing through the second liquid crystal panel 20. When the light with a small viewing angle and the light with a large viewing angle continue to pass through the first liquid crystal panel 10, since polarization directions of the light with a small viewing angle and the light with a large viewing angle are parallel to the first polarizer, users watching at a small viewing angle and users watching at a large viewing angle may both see corresponding pictures, and displaying at this time is performed in the sharing mode. When the second liquid crystal panel 20 is powered on, a polarization state of light with a small viewing angle from the back light assembly 30 does not change when the light passes through the second liquid crystal panel 20, but a polarization state of light with a large viewing angle from the back light assembly 30 changes when the light passes through the second liquid crystal panel 20. When the light with a small viewing angle continues to pass through the first liquid crystal panel 10, since the polarization direction of the light with a small viewing angle is parallel to the first polarizer, users watching at a small viewing angle may see the corresponding picture. When the light with a large viewing angle continues to pass through the first liquid crystal panel 10, since the polarization direction of the light with a large viewing angle is not parallel to the first polarizer, the light with a large viewing angle cannot pass through the first polarizer, users watching at a large viewing angle can only see a black picture, and displaying at this time is performed in the privacy mode. Herein, a viewing angle refers to an included angle between a user's sight line and a normal direction of the first liquid crystal panel.

In an exemplary embodiment, in a plane parallel to the first liquid crystal panel, the first liquid crystal panel 10 may include an effective display area AA and a frame area FA, wherein the effective display area AA is located in the middle of the first liquid crystal panel 10, which is an area for displaying pictures, and the frame area FA is located at a periphery of the effective display area AA, which is an area where a corresponding drive circuit is disposed.

Figure 3:
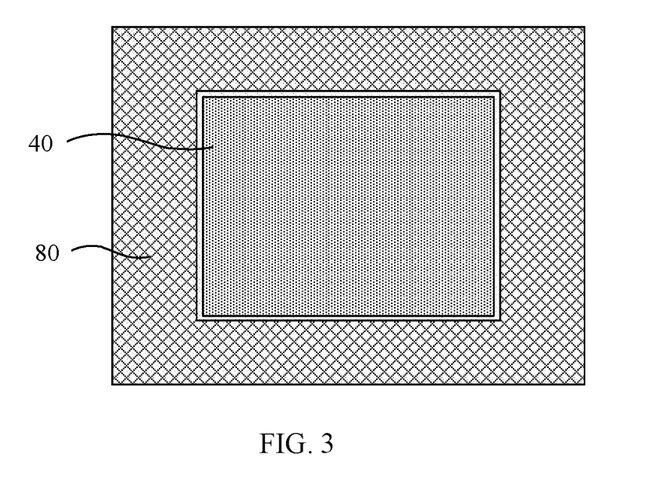
FIG. 3 is a schematic plan view of a seal frame according to an exemplary embodiment of the present disclosure.
Figure 4:
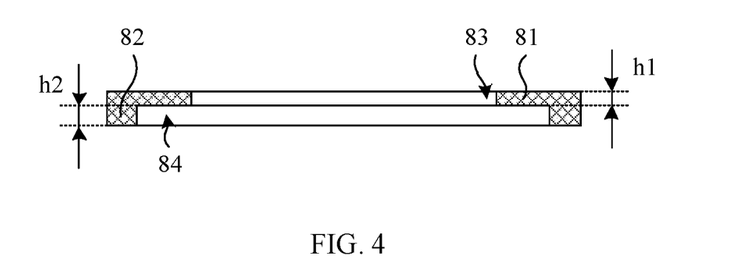
FIG. 4 a schematic sectional view of a seal frame according to an exemplary embodiment of the present disclosure.

FIG. 3 is a schematic plan view of a seal frame according to an exemplary embodiment of the present disclosure. As shown in FIG. 2 and FIG. 3, the seal frame 80 has an annular structure with an opening in the middle. The seal frame 80 has an opening area corresponding to the effective display area AA in the first liquid crystal panel 10, and an annular area corresponding to the frame area FA in the first liquid crystal panel 10. FIG. 4 a schematic sectional view of the seal frame according to an exemplary embodiment of the present disclosure. As shown in FIG. 2, FIG. 3 and FIG. 4, the seal frame 80 may include a first seal frame 81 and a second seal frame 82 which are stacked, wherein the first seal frame 81 is disposed on a side close to the first liquid crystal panel 10 and the second seal frame 82 is disposed on a side close to the second liquid crystal panel 20. Surfaces of the first seal frame 81 and the second seal frame 82 close to each other are in contact with each other, a surface of the first seal frame 81 away from the second seal frame 82 is in contact with and connected to the first liquid crystal panel 10, and a surface of the second seal frame 82 away from the first seal frame 81 is in contact with and connected to the second liquid crystal panel 20. A first opening 83 is formed by an inner edge of the annular first seal frame 81, and the spacer film 40 is located in the first opening 83. An orthographic projection of the first opening 83 on the second liquid crystal panel 20 includes an orthographic projection of the spacer film 40 on the second liquid crystal panel 20. A second opening 84 is formed by an inner edge of the annular second seal frame 82 and the second polarizer 60 is located in the second opening 84. An orthographic projection of the second opening 84 on the second liquid crystal panel 20 includes an orthographic projection of the second polarizer 60 on the second liquid crystal panel 20. In the exemplary embodiments of the present disclosure, "an orthographic projection of A includes an orthographic projection of B" refers to that a boundary of the orthographic projection of B falls within a range of a boundary of the orthographic projection of A or the boundary of the orthographic projection of A overlaps with the boundary of the orthographic projection of B.

In an exemplary embodiment, an outer edge of the annular first seal frame 81 and an outer edge of the annular second seal frame 82 may be flush with each other, and the first seal frame 81 and the second seal frame 82 may be in an integrated structure.

In an exemplary embodiment, a thickness of the first seal frame 81 h1 is about 40 μm to 100 μm. In this way, space of the first opening 83 formed by the inner edge of the first seal frame 81 can accommodate the spacer film 40 and the adhesive layer 41. For example, the thickness h1 of the first seal frame 81 may be about 60 μm, which may not only accommodate the spacer film 40 and the adhesive layer 41 with a sum of thicknesses of 60 μm, but also make a surface of the first seal frame 81 close to the first liquid crystal panel 10 flush with a surface of the spacer film 40 close to the first liquid crystal panel 10. In an exemplary embodiment, surfaces of the first seal frame and the spacer film close to the first liquid crystal panel are flush with each other, which can not only improve an effect of supporting the first liquid crystal panel by the seal frame, but also make the spacer film play a role in supporting the first liquid crystal panel, thus effectively avoiding the adsorption between the first liquid crystal panel and the second liquid crystal panel, and effectively eliminating the water stain defects and rainbow pattern defects caused by the adsorption.

In an exemplary embodiment, a thickness of the second seal frame 82 h2 is about 100 μm to 150 μm. Since a thickness of the second polarizer 60 is about 100 μm to 150 μm, space of the second opening 84 formed by the inner edge of the second seal frame 82 can accommodate the second polarizer 60. For example, the thickness h2 of the second seal frame 82 may be about 125 μm, which can not only accommodate the second polarizer 60 with a thickness of about 125 μm, but also make a surface of the second polarizer 60 close to the first seal frame 81 be in contact with a surface of the first seal frame 81 close to the second polarizer 60. In an exemplary embodiment, the first seal frame and the second polarizer are closely attached to each other, which can not only improve a support effect of the seal frame, but also improve an attachment effect of the second polarizer and the second liquid crystal panel.

In an exemplary embodiment, since the seal frame is provided with a second opening, the second polarizer is disposed in the second opening of the seal frame and a thickness of the second polarizer is equivalent to that of the second seal frame, an overall thicknesses of the second polarizer and the seal frame are effectively reduced, which avoids an increase in the overall thickness caused by the arrangement of the seal frame and is beneficial to reducing the overall thickness of the display device. Since the seal frame is further provided with the first opening, and the spacer film and adhesive layer are disposed in the first opening, and thicknesses of the spacer film and adhesive layer are equivalent to the thickness of the first seal frame, arrangement of the spacer film does not additionally increase the overall thickness of the display device, avoids an increase in the overall thickness caused by the arrangement of the spacer film, which is beneficial to reducing the overall thickness of the display device.

In a display device, the spacer film is attached to the first liquid crystal panel, and an attachment area includes an effective display area and a frame area. Since the seal frame is disposed between the spacer film and the second liquid crystal panel, a distance between the first liquid crystal panel and the second liquid crystal panel is a sum of thicknesses of the seal frame and the spacer film. According to the exemplary embodiment of the present disclosure, the spacer film is attached to the second liquid crystal panel, the first opening and the second opening are provided on the seal frame, and the spacer film is disposed in the first opening, so that the distance between the first liquid crystal panel and the second liquid crystal panel is only the thickness of the seal frame, which is beneficial to reducing the overall thickness of the display device.

Figure 5:
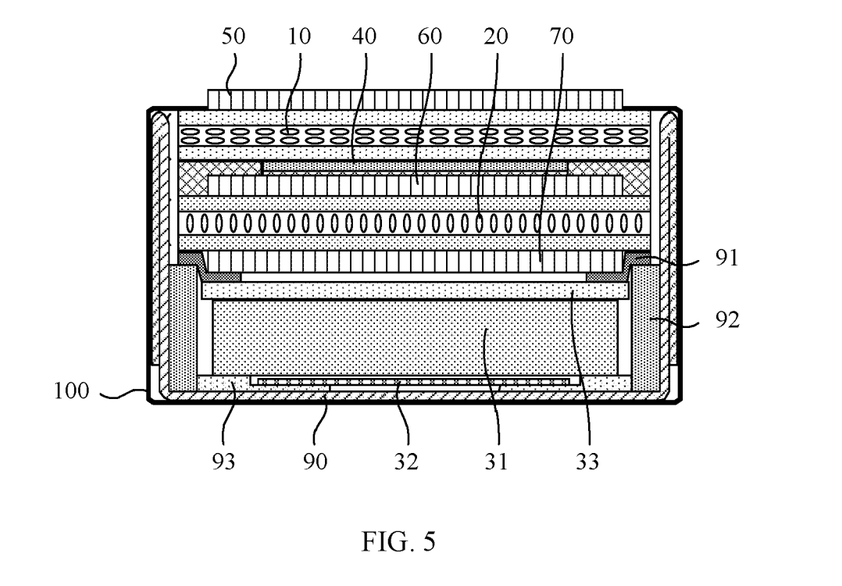
FIG. 5 is a schematic diagram of a structure of another display device according to an exemplary embodiment of the present disclosure.

FIG. 5 is a schematic diagram of a structure of another display device according to an exemplary embodiment of the present disclosure. As shown in FIG. 5, the display device may include a first liquid crystal panel 10, a second liquid crystal panel 20, a back light assembly 30, a spacer film 40, a first polarizer 50, a second polarizer 60, a third polarizer 70, a seal frame 80, a back panel 90 and an outer frame 100. In an exemplary embodiment, the second liquid crystal panel 20 is disposed on a light-emitting side of the back light assembly 30. The third polarizer 70 is disposed on a surface of the second liquid crystal panel 20 close to the back light assembly 30. The second polarizer 60 and the seal frame 80 are disposed on a surface of the second liquid crystal panel 20 away from the back light assembly 30. The spacer film 40 is attached to a surface of the second polarizer 60 through the adhesive layer 41. The first liquid crystal panel 10 is disposed on a surface of the seal frame 80 away from the back light assembly 30. The first polarizer 50 is disposed on a surface of the first liquid crystal panel 10 away from the back light assembly 30.

In an exemplary embodiment, the back panel 90 may include a bottom panel and folded edges, the folded edges are vertically connected to a periphery of the bottom panel, and together with the bottom panel, form an accommodation cavity for accommodating the first liquid crystal panel 10, the second liquid crystal panel 20 and the back light assembly 30. The outer frame 100 may include a frame and a side wall, wherein the frame covers a periphery of the first liquid crystal panel and the side wall is vertically connected to a periphery of the frame and wraps the back panel 90.

In an exemplary embodiment, the back light assembly 30 may include a light guide panel 31, a reflective sheet 32 and an optical film 33. The light guide panel 31 is disposed in the accommodation cavity formed by the bottom panel and the folded edges of the back panel 90 and is located above the bottom panel. The light guide panel converts a point light source or a linear light source generated by a light source into a surface light source, which is reinforced by the optical film and then emitted to the second liquid crystal panel 20. The reflective sheet 32 is disposed on a side of the light guide panel 31 close to the bottom panel, the optical film 33 is disposed on a side of the light guide panel 31 close to the second liquid crystal panel 20, and the light source (not shown) is disposed on an incident surface of the light guide panel 32.

In an exemplary embodiment, the back panel 90 may further include a first support member 91, a second support member 92 and a third support member 93. The first support member 91 is disposed between the optical film 33 and the third polarizer 70 and is used for supporting the second liquid crystal panel 20. The second support member 92 is disposed between the bottom panel of the back panel 90 and the first support member 91 for supporting the first support member 91. The third support member 93 is disposed between the bottom panel of the back panel 90 and the reflective sheet 32 for supporting the reflective sheet 32.

A manufacturing process of the display device of the exemplary embodiment of the present disclosure is further described below. The whole manufacturing process of the display device of the exemplary embodiment of the present disclosure mainly includes three parts: a panel manufacturing process, a film attachment process and an assembly process. Among them, the manufacturing of the panel may include manufacturing of the first liquid crystal panel, manufacturing of the second liquid crystal panel and manufacturing of the spacer film, etc. There is no requirement of a precedence order between manufacturing of the liquid crystal panel and that of the spacer film, and they may be carried out simultaneously.

Taking the first liquid crystal panel adopting an ADS display mode and the second liquid crystal panel adopting twisted nematic (TN) as an example, the whole manufacturing process of the display device will be explained.

I. Manufacturing a First Liquid Crystal Panel.

In an exemplary embodiment, the manufacturing of a first liquid crystal panel may include substrate manufacturing and cell sealing, and the substrate manufacturing may include manufacturing of a first array substrate and manufacturing of a first counter substrate, and a mature manufacturing process in the art may be adopted. For example, the first array substrate may be manufactured by the following process: firstly, forming patterns of a gate line, a gate electrode and a first common electrode on a first array base substrate, wherein the first common electrode is a plate electrode; subsequently, forming a first insulating layer covering the patterns of the gate line, the gate electrode and the first common electrode pattern, and forming an active layer pattern on the first insulating layer; subsequently, forming patterns of a data line, a source electrode and a drain electrode, and forming a conductive channel between the source electrode and the drain electrode; then forming a second insulating layer covering the data line, the source electrode and the drain electrode, and forming a pattern of first pixel electrode on the second insulating layer, wherein the first pixel electrode is connected to the drain electrode through a via hole formed in the second insulating layer, and the first pixel electrode is a slit electrode composed of multiple strip electrodes; subsequently, forming a planarization layer covering the first pixel electrode, coating an alignment film on the planarization layer, then performing alignment treatment on the alignment film to form an alignment layer. Herein, the gate electrode, the active layer, the source electrode and the drain electrode form a first thin film transistor. For another example, the first counter substrate may be manufactured by the following process: first, forming black matrix patterns on the first counter substrate, wherein multiple black matrices are disposed at intervals; then, respectively forming patterns of color photoresists between the black matrices disposed at intervals, wherein the color photoresists include red (R) photoresists, green (G) photoresists and blue (B) photoresists, which are arranged according to a set rule; then, forming a planarization layer covering the black matrices and the color photoresists, coating the alignment film on the planarization layer, then performing alignment treatment on the alignment film to form an alignment layer.

In an exemplary embodiment, the following process may be adopted for the cell sealing. Firstly, coating frame sealant on a peripheral area of the first array substrate, and dripping liquid crystal on a display area of the first array substrate; under vacuum condition, aligning, relatively approaching and pressing the first counter substrate and the first array substrate; and curing and hardening the frame sealant by ultraviolet curing and/or thermal curing, wherein the first array substrate, the first counter substrate and the first liquid crystal layer therebetween form the first liquid crystal panel.

II. Manufacturing a Second Liquid Crystal Panel.

In an exemplary embodiment, the manufacturing of the second liquid crystal panel may include substrate manufacturing and cell sealing, and the substrate manufacturing may include manufacturing of a second array substrate and manufacturing of a second counter substrate. The manufacturing process is similar to that of the first array substrate and the first counter substrate, which will not be repeatedly described here. The second array substrate, the second counter substrate and the second liquid crystal layer therebetween form the second liquid crystal panel.

III. Process of Film Layer Attaching.

The process of film layer attaching may include attaching the spacer film and the polarizer. There is no requirement of precedence order between attaching of the first polarizer, the second polarizer and the third polarizer, and the spacer film is attached after the second polarizer is attached.

For example, the following process may be adopted for attachment. First, attaching a first polarizer to a light-emitting side of the first liquid crystal panel, attaching a second polarizer to a light-emitting side of the second liquid crystal panel, attaching a third polarizer to a light incident side of the second liquid crystal panel, and then attaching a spacer film to the second polarizer.

In an exemplary embodiment, surface treatment may be performed on the spacer film to form an adhesive layer on a side of the spacer film, and then a side of the spacer film on which the adhesive layer is formed is oriented towards the second polarizer, and the spacer film is attached to the second polarizer by the adhesive layer.

In an exemplary embodiment, the spacer film is located in the middle of the second liquid crystal panel, and a position of the spacer film corresponds to an effective display area of the second liquid crystal panel.

IV. Assembly Process.

In an exemplary embodiment, a mature assembly process in the art may be adopted in the assembly process. For example, the following process may be adopted for assembly. Disposing the first seal frame on a surface of the second liquid crystal panel on which the second polarizer is attached, disposing the second seal frame on a side close to the second liquid crystal panel, disposing the first seal frame on a side away from the second liquid crystal panel, wherein the second polarizer is located in the second opening of the seal frame, and the spacer film is located in the first opening of the seal frame. Subsequently, disposing the first liquid crystal panel on a surface of the seal frame away from the second liquid crystal panel, forming a display assembly including the first liquid crystal panel, the second liquid crystal panel and the seal frame. Subsequently, sequentially disposing the back light assembly and the display assembly in an accommodation cavity of a back panel and then buckling an outer frame.

It may be seen from the structure and manufacturing process of the display device according to the exemplary embodiment of the present disclosure that in the exemplary embodiment of the present disclosure, the spacer film is attached to the second liquid crystal panel, which not only eliminates water stain defects and rainbow pattern defects caused by adsorption, but also does not increase an overall thickness of the display device and affect a privacy function. On the premise of ensuring the privacy function and not increasing the overall thickness, the problems such as water stain defects and rainbow pattern defects are effectively solved. In addition, the exemplary embodiment of the disclosure shows that the display device is manufactured without adding new processes and introducing new materials, which has good process compatibility, low process difficulty and low production costs, and thus can ensure the yield, and has a good application prospect.

An embodiment of the present disclosure further provides a method for manufacturing a display device. In an exemplary embodiment, the method for manufacturing the display device may include:

S1. Preparing a first liquid crystal panel for displaying a picture, a second liquid crystal panel for switching between a privacy mode and a sharing mode, a back light assembly for emitting light and a spacer film;

S2. Attaching the spacer film on the second liquid crystal panel; and

S3. Disposing a second liquid crystal panel on a light-emitting side of the back light assembly, disposing the first liquid crystal panel on a side of the second liquid crystal panel away from the back light assembly, and disposing the spacer film between the first liquid crystal panel and the second liquid crystal panel.

In an exemplary embodiment, the manufacturing method may further include preparing a seal frame.

In an exemplary embodiment, the seal frame may include a first seal frame and a second seal frame which are stacked; a first opening is formed at an inner edge of the annular first seal frame, and a second opening is formed at an inner edge of the annular second seal frame;

In an exemplary embodiment, in step S3, disposing the first liquid crystal panel on a side of the second liquid crystal panel away from the back light assembly includes:

disposing the seal frame on a side of the second liquid crystal panel away from the back light assembly; disposing the second seal frame on a side near the second liquid crystal panel; disposing the first seal frame on a side away from the second liquid crystal panel; disposing the spacer film in the first opening; and disposing the second polarizer in the second opening; and disposing the first liquid crystal panel on a side of the seal frame away from the second liquid crystal panel.

The display device of the exemplary embodiments of the present disclosure may be any product or component with a display function, such as a mobile phone, a tablet computer, a television, a display, a laptop computer, a digital photo frame, a navigator and industrial-controlled medical care.

Although the embodiments disclosed in the present disclosure are as described above, the contents described are only the embodiments used to facilitate the understanding of the present disclosure, and are not intended to limit the present disclosure. Those skilled in the art may make any modification and change to the form and details of the implementation without departing from the spirit and scope of the present disclosure. However, the scope of protection of the present disclosure should still be subject to the scope defined by the appended claims.

What is claimed is:

1. A display device, comprising: a first liquid crystal panel for displaying a picture, a second liquid crystal panel for switching between a privacy mode and a sharing mode, a back light assembly for emitting light, a first polarizer, a second polarizer, a third polarizer and a seal frame, wherein the second liquid crystal panel is disposed on a light-emitting side of the back light assembly; the first liquid crystal panel is disposed on a side of the second liquid crystal panel away from the back light assembly; a spacer film is disposed between the first liquid crystal panel and the second liquid crystal panel; and the spacer film is attached to the second liquid crystal panel;

wherein the first polarizer is disposed on a surface of the first liquid crystal panel away from the back light assembly; the second polarizer and the seal frame are disposed on a surface of the second liquid crystal panel away from the back light assembly; the third polarizer is disposed on a side of the second liquid crystal panel close to the back light assembly; the spacer film is disposed on a surface of the second polarizer away from the back light assembly; and wherein the seal frame comprises a first seal frame and a second seal frame which are stacked, wherein the first seal frame is disposed on a side close to the first liquid crystal panel and the second seal frame is disposed on a side close to the second liquid crystal panel; an inner edge of the annular first seal frame forms a first opening for accommodating the spacer film, and an inner edge of the annular second seal frame forms a second opening for accommodating the second polarizer.

2. The display device according to claim 1, wherein a material of the spacer film comprises polymethylmethacrylate or polycarbonate.

3. The display device according to claim 1, wherein a thickness of the spacer film is 30 µm to 90 µm.

4. The display device according to claim 1, wherein a side surface of the spacer film is provided with an adhesive layer and the spacer film is attached to the second liquid crystal panel through the adhesive layer.

5. The display substrate panel according to claim 4, wherein a thickness of the adhesive layer is less than 10 µm.

6. The display device according to claim 4, wherein the adhesive layer is formed by performing surface treatment on the spacer film.

7. The display device according to claim 1, wherein,
the first liquid crystal panel comprises a first array substrate, a first counter substrate and a first liquid crystal layer disposed between the first array substrate and the first counter substrate; and
the second liquid crystal panel comprises a second array substrate, a second counter substrate and a second liquid crystal layer disposed between the second array substrate and the second counter substrate.

8. The display device according to claim 7, wherein a ratio of a refractive index of the spacer film to a refractive index of the second liquid crystal layer in the second liquid crystal panel is 0.9 to 1.1.

9. The display device according to claim 8, wherein a refractive index of the spacer film is equal to the refractive index of the second liquid crystal layer.

10. The display device according to claim 1, wherein a transmission axis of the first polarizer is perpendicular to a transmission axis of the second polarizer, and the transmission axis of the second polarizer is perpendicular to a transmission axis of the third polarizer.

11. The display device according to claim 1, wherein an orthographic projection of the first opening on the second liquid crystal panel comprises an orthographic projection of the spacer film on the second liquid crystal panel; and an orthographic projection of the second opening on the second liquid crystal panel comprises an orthographic projection of the second polarizer on the second liquid crystal panel.

12. The display device according to claim 1, wherein a thickness of the first seal frame is 40 μm to 100 μm, and a thickness of the second seal frame is 100 μm to 150 μm.

13. The display device according to claim 1, wherein a surface of the first seal frame close to the first liquid crystal panel is flush with a surface of the spacer film close to the first liquid crystal panel.

14. The display device according to claim 11, wherein a surface of the second polarizer close to the first seal frame is in contact with a surface of the first seal frame close to the second polarizer.

15. A method for manufacturing a display device, comprising:
preparing a first liquid crystal panel for displaying a picture, a second liquid crystal panel for switching between a privacy mode and a sharing mode, a back light assembly for emitting light and a spacer film;
attaching the spacer film on the second liquid crystal panel;
disposing a second liquid crystal panel on a light-emitting side of the back light assembly, disposing the first liquid crystal panel on a side of the second liquid crystal panel away from the back light assembly; and disposing the spacer film between the first liquid crystal panel and the second liquid crystal panel; and
preparing a seal frame, wherein the seal frame comprise a first seal frame and a second seal frame which are stacked; an inner edge of the annular first seal frame is formed with a first opening, and an inner edge of the annular second seal frame is formed with a second opening,
wherein disposing the first liquid crystal panel on the side of the second liquid crystal panel away from the back light assembly comprises:
disposing the seal frame on a side of the second liquid crystal panel away from the back light assembly; disposing the second seal frame on a side near the second liquid crystal panel; disposing the first seal frame on a side away from the second liquid crystal panel; disposing the spacer film in the first opening; and disposing the second polarizer in the second opening; and
disposing the first liquid crystal panel on a side of the seal frame away from the second liquid crystal panel.

* * * * *